United States Patent
Dikhit et al.

(10) Patent No.: US 10,048,995 B1
(45) Date of Patent: *Aug. 14, 2018

(54) METHODS AND APPARATUS FOR IMPROVED FAULT ANALYSIS

(71) Applicant: Juniper Networks, Inc., Sunnyvale, CA (US)

(72) Inventors: Aniruddh S. Dikhit, San Jose, CA (US); Joseph L. White, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,369

(22) Filed: Feb. 28, 2017

Related U.S. Application Data (63) Continuation of application No. 13/852,610, filed on Mar. 28, 2013, now Pat. No. 9,588,834.

(51) Int. Cl.
*G06F 11/00* (2006.01)
*G06F 11/07* (2006.01)

(52) U.S. Cl.
CPC ...... *G06F 11/0766* (2013.01); *G06F 11/0709* (2013.01); *G06F 11/079* (2013.01); *G06F 11/0754* (2013.01); *G06F 11/0769* (2013.01); *G06F 11/0787* (2013.01)

(58) Field of Classification Search
CPC ................................... G06F 11/0766–11/0787
See application file for complete search history.

(56) References Cited

U.S. PATENT DOCUMENTS

| | | | |
|---|---|---|---|
| 7,493,598 B1* | 2/2009 | Craggs ................ | G06F 11/3636 714/38.1 |
| 2003/0204781 A1 | 10/2003 | Peebles et al. | |
| 2004/0250182 A1* | 12/2004 | Lyle .................... | G06F 11/0787 714/723 |
| 2011/0078515 A1* | 3/2011 | Yasukawa ........... | G06F 11/0733 714/48 |
| 2011/0231712 A1* | 9/2011 | Hirata ................. | G06F 11/0778 714/49 |
| 2013/0138901 A1 | 5/2013 | Cordero et al. | |
| 2014/0006881 A1* | 1/2014 | Loimuneva ......... | G06F 11/0706 714/57 |
| 2014/0032859 A1 | 1/2014 | Tanaka | |

* cited by examiner

*Primary Examiner* — Michael Maskulinski
(74) *Attorney, Agent, or Firm* — Cooley LLP (57) ABSTRACT

A method includes receiving a signal indicative of a value of a data point associated with a compute device at a first time. The value of the data point includes a data point category that is correlated with a fault category. The compute device is operatively coupled to a record module having a protected mode and an unprotected mode. A signal is received indicative of a value of the data point at a second time, after the first time. When a characteristic of a change in the value of the data point at the first time to value of the data point at the second time crosses a threshold in a first direction, a signal is sent to the record module indicative of an instruction to record data associated with the compute device in the protected mode to define a protected data set.

20 Claims, 4 Drawing Sheets

METHODS AND APPARATUS FOR IMPROVED FAULT ANALYSIS

CROSS REFERENCE TO RELATED APPLICATIONS

This application is a continuation of U.S. patent application Ser. No. 13/852,610, (now U.S. Pat. No. 9,588,834), filed Mar. 28, 2013, entitled "METHODS AND APPARATUS FOR IMPROVED FAULT ANALYSIS", the contents of which are incorporated herein by reference.

BACKGROUND

Some embodiments described herein relate generally to fault analysis and more particularly, to methods and apparatus for historical fault and event correlation associated with performing a deep analysis of fault patterns.

Some known compute devices include and/or can be operably coupled to a logging system configured to generate a log of, for example, a fault associated with the compute device. In some instances, an event and/or a condition (e.g., a fault condition) can be such that known logging systems begin recording a set of data based on the event and/or the condition. In some instances, an analysis of the recorded data is performed by a human and/or a machine to draw correlations of the event and/or condition leading to, for example, the fault. Such systems, however, often record a limited amount of data based on the event and/or the condition and can often ignore a set of conditions that are trending toward the event (e.g., a fault). Moreover, some events and/or conditions can be ephemeral and difficult to reproduce for diagnostic purposes. In this manner, some known fault analysis result in an incomplete analysis of the event(s) and/or the condition(s) associated with the fault.

Thus, a need exists for improved methods and apparatus for historical fault and event correlation associated with performing a deep analysis of fault patterns.

SUMMARY

Methods and apparatus of historical fault and event correlation associated with performing a deep analysis of fault patterns are described herein. In some embodiments, a method includes receiving a signal indicative of a value associated with a data point category associated with a compute device at a first time. The data point category is correlated with a fault category. The compute device is operatively coupled to a record module having a protected mode and an unprotected mode. A signal is received indicative of a value associated with the data point category at a second time, after the first time. When a characteristic of a change in the value associated with the data point category at the first time to value associated with the data point category at the second time crosses a threshold in a first direction, a signal is sent to the record module indicative of an instruction to record data associated with the compute device in the protected mode to define a protected data set.

DETAILED DESCRIPTION

In some embodiments, a method includes receiving a signal indicative of a value associated with a data point category associated with a compute device at a first time. The data point category is correlated with a fault category. The compute device is operatively coupled to a record module having a protected mode and an unprotected mode. A signal is received indicative of a value associated with the data point category at a second time, after the first time. When a characteristic of a change in the value associated with the data point category at the first time to value associated with the data point category at the second time crosses a threshold in a first direction, a signal is sent to the record module indicative of an instruction to record data associated with the compute device in the protected mode to define a protected data set.

In some embodiments, a fault module is operatively coupled to a compute device and to a record module. The fault detection module is configured to receive a signal indicative of a change in a value associated with a data point category at a first time to a value associated with the data point category at a second time, after the first time. The data point category is associated with a first rule. The fault detection module is configured to send a signal to the record module indicative of an instruction to define a protected data set based on a characteristic of the change in value associated with the data point category at the first time to the value associated with the data point category at the second time. The fault detection module is configured to analyze the protected data set to define a second rule.

In some embodiments, a non-transitory processor-readable medium stores code representing instructions to be executed by a processor to receive, at a first time, a first signal indicative of a normal operating status of a compute device. The compute device is operably coupled to a record module having a protected mode and an unprotected mode. The code includes instructions to cause the processor to receive, after a second time that is after the first time, a signal indicative of a value associated with a data point category associated with the compute device at the second time, and a second signal indicative of a the normal operating status of the compute device. The data point category is correlated with a faulty operating status of the compute device. The code includes instructions to cause the processor to receive, after a third time that is after the second time, a signal indicative of a value associated with the data point category at the third time, and a third signal indicative of the normal operating status of the compute device. When a characteristic of a change in the value associated with the data point category at the second time to the value associated with the data point category at the third time crosses a threshold in a first direction, the code includes instructions to cause the processor to send, at a fourth time after the third time, a signal to the record module indicative of an instruction to record data associated with the compute device in the protected mode to define a protected data set.

As used herein, a module can be, for example, an assembly of hardware and/or software modules (stored in memory and/or executing in hardware), or a set of operatively-coupled electrical components, and can include, for example, a memory, a processor, electrical traces, optical connectors, software (stored in memory and/or executing in hardware), and/or the like.

As used herein, the singular forms "a," "an" and "the" include plural referents unless the context clearly dictates otherwise. Thus, for example, the term "a compute device" is intended to mean a single compute device or a set of compute devices with similar functionalities associated with computing information or data.

Figure 1:
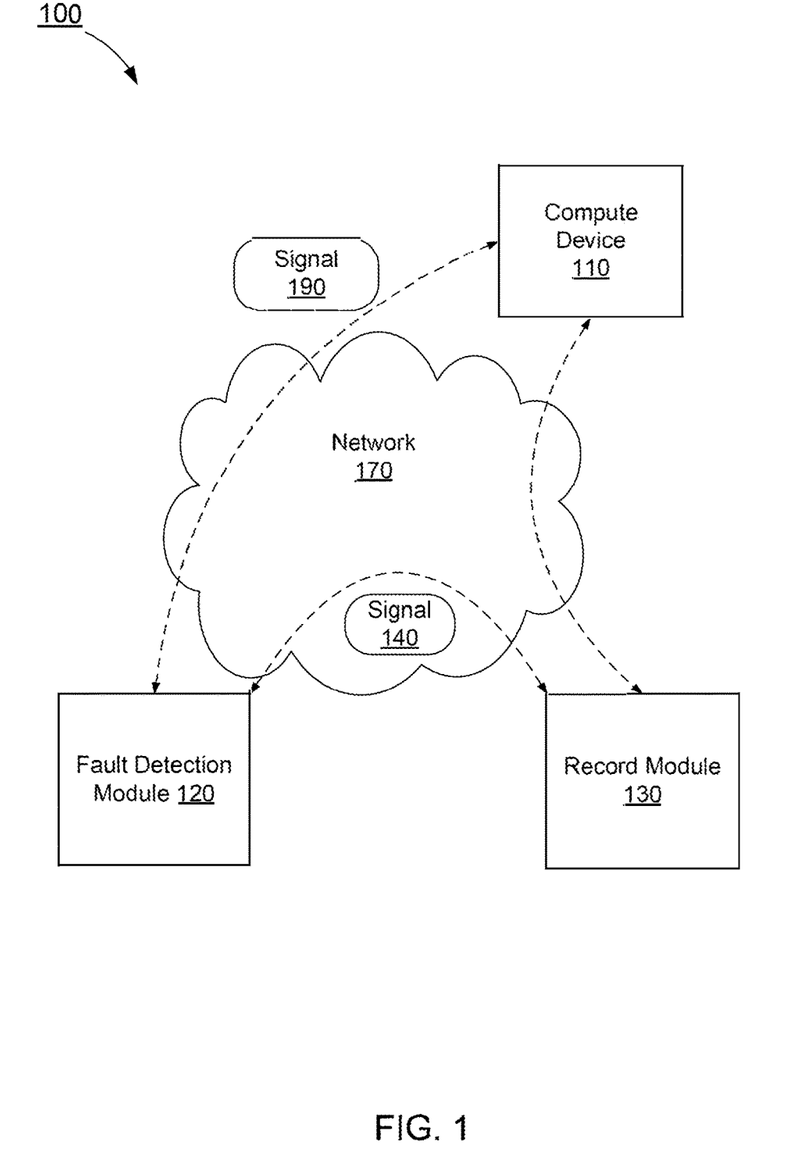
FIG. 1 is a schematic illustration of a system configured to record data associated with a fault condition, according to an embodiment.

FIG. 1 is a schematic illustration of a system 100 configured to record a set of data associated with, for example, a fault event and/or condition, according to an embodiment. The system 100 includes a fault detection module 120, a record module 130, and a compute device 110 that are operably coupled (e.g., in electrical communication) via a network 170. Although not shown in FIG. 1, in some embodiments, a system can include more than one fault detection module and/or more than one record module that are each operably coupled to more than one compute device via a network. For example, the fault detection module 120 can be operatively coupled to and/or support more than one compute device 110 such that the fault detection module 120 can receive a signal from more than one compute device 110 substantially simultaneously. Similarly, the record module 130 can be operatively coupled to and/or support more than one compute device 110 such that the record module 130 can receive a signal from more than one compute device 110 substantially simultaneously. While the system 100 is shown in FIG. 1 being in electrical communication via the network 170, in other embodiment, a system can include any number of fault detection modules, record modules, and/or compute devices that are operably coupled (e.g., in electrical communication) via more than one network.

The compute device 110 can be any suitable electronic device, equipment, and/or component. For example, in some embodiments, the compute device 110 can be a user device (e.g., a personal computer (PC), a laptop, Personal Digital Assistant (PDA), a tablet, a smart-phone, and/or the like), and/or a host device (e.g., a server, a top-of-rack device (TOR), a network storage device, a server blade, a switch fabric node, and/or the like). Although not shown in FIG. 1, the compute device 110 can include, for example, at least a memory, a processor, and a communication device. The communication device can be, for example, one or more network interface devices (e.g., a network interface card, a communication port, and/or the like) that can connect the compute device 110 to the network 170.

The processor of the compute device 110 can be any processing device or component configured to execute a set of instructions that are stored, for example, in the memory of the compute device 110. For example, the processor can be or can include a central processing unit (CPU), a general processing unit, a network processor, a front end processor, an Application-Specific Integrated Circuit (ASIC), a Digital Signal Processor (DSP), a Field Programmable Gate Array (FPGA) and/or the like. In some embodiments, the processor can include one or more software modules that can be associated with, for example, a process, application, virtual machine, and/or some other software module (stored in memory and/or executing in hardware).

The memory of the compute device 110 can be, for example, a random access memory (RAM) (e.g., a dynamic RAM, a static RAM), a flash memory, a removable memory, a memory buffer, a hard drive, and/or so forth. The memory can store and/or include instructions to cause the processor of the compute device 110 to perform a set of processes that can be associated with, for example, an application, a virtual machine, a switching process, a routing process, and/or the like. Specifically, the memory can include instructions to cause the processor of the compute device 110 to send a signal 190 to the fault detection module 120 (e.g., via the network 170) indicative of a value associated with a data point category, as described in further detail herein.

The fault detection module 120 can be any suitable device, equipment, component, and/or module. For example, in some embodiments, the fault detection module 120 can be a compute device such as a personal computer, a laptop, a server, a tablet, a mobile device, and/or the like. In other embodiments, a fault detection module can be a hardware module and/or a software module executed at a processor. For example, a fault detection module can be a software module stored in a memory of a compute device (e.g., a compute device that can be substantially similar to the compute device 110 shown in FIG. 1) and executed in hardware (e.g., a processor) of that compute device. As described in further detail herein, the fault detection module 120 can receive the signal 190 from the compute device 110 indicative of an event and/or condition (e.g., a value associated with a data point category can correspond to an event and/or condition) associated with a fault state of the compute device 110 and can send a signal 140 to the record module 130 indicative of an instruction to record data associated with the compute device 110.

The record module 130 can be any suitable device, equipment, component, and/or module. For example, in some embodiments, the record module 130 can be a compute device such as those described above. In other embodiments, a record module can be a hardware module and/or a software module stored in a memory and executed at a processor. Although shown independently from and operably coupled to the fault detection module 120 and the compute device 110, in other embodiments, a fault detection module can include a record module (e.g., as a hardware and/or software module). In still other embodiments, a record module can be included in a compute device. For example, a compute device (e.g., a compute device that can be substantially similar to the compute device 110 shown in FIG. 1) can be a PC or the like and can include the record module 130 as a hardware and/or software module. The record module 130 can be, for example, a log system or the like configured to record and at least temporarily store a log of data associated with a compute device (e.g., a compute device that can be substantially similar to the compute device 110 shown in FIG. 1). More specifically, the record module 130 can have a protected mode of recording and an unprotected mode of recording. While in the unprotected mode of recording, the record module 130 can temporarily store a set of data (e.g., a log) collected at a first time and/or during a first time period and can systematically overwrite the set of data (e.g., at least a portion of the stored logs) with a set of data recorded at a second time and/or during a second time period, after the first time and/or after the first time period, respectively. While in the protected mode of recording, the record module 130 can receive and store a set of data (e.g., a log) that is protected from being overwritten. In other words, a set of data collected and/or received while the record module 130 is in the protected mode can define a protected data set. As described in further detail herein, the record module 130 can receive the signal 140 from the fault detection module 120 that is indicative of an instruction to record data associated with the compute device 110 in the protected mode.

The network 170 can be any type of network that can operatively couple the fault detection module 120, the record module 130, and the compute device 110. The network 170 can be implemented as a wired network, a wireless network, or a combination of wired and wireless network. In some embodiments, the network 170 can be, for example, a local area network (LAN), a wide area network (WAN), a virtual network, a telecommunications network, the Internet, etc. In some embodiments, for example, the fault detection module 120 can be connected to the compute device 110 and/or the record module 130 via an Internet service provider (ISP) and the Internet (e.g., network 170). Although the fault detection module 120 is shown in FIG. 1 as being operatively coupled to the record module 130 through the network 170, in other embodiments, a fault detection module and a record module can be directly coupled together without any intermediate device. For example, the fault detection module 120 and the record module 130 can be collocated at a single platform or device. Similarly, in some embodiments, the record module 130 and the compute device 110 can be collocated at a single platform.

The system 100 can be used to monitor and/or record operations of the compute device 110 and further used to selectively protect a set of data from deletion (e.g., from being systematically overwritten as described above) based, at least in part, on a value associated with the data point category. For example, the fault detection module 130 can receive the signal 190 that is indicative of a data point category having a value at a given time associated with the performance, operations, conditions, and/or status of all or a portion of the compute device 110. Similarly stated, fault detection module 130 can receive the signal 190 at a given time that can include an indicator associated with the data point category (e.g., a name of a data point category, a unit of measure associated with a data point category, an identifier associated with a unique data point category, and/or the like) as well as an indicator associated with a value associated with the data point category at that given time. As described in further detail herein, the data point category can be correlated with a fault category associated with the compute device 110.

The proceeding list of exemplary data point categories and the corresponding values of the given data point category at a given time are provided by way of example only and not limitation. For example, in some instances, the signal 190 can be indicative of and/or can include an identifier associated with a data point category "page faults" having a value of "10;" the signal 190 can be indicative of and/or can include an identifier associated with a data point category "repair rate" having a value "3 times a month;" the signal 190 can be indicative of and/or can include an identifier associated with a data point category "network throughput" having a value can be "100 Mps;" the signal 190 can be indicative of and/or can include an identifier associated with a data point category "CPU utilization" having a value of "0.5%;" the signal 190 can be indicative of and/or can include an identifier associated with a data point category "temperature" having a value of "100° F.;" the signal 190 can be indicative of and/or can include an identifier associated with a data point category "power consumption" having a value "100 Watt;" the signal 190 can be indicative of and/or can include an identifier associated with a data point category "mean time-between-failure" having a value "28 hours."

In some embodiments, the signal 190 can be indicative of a value associated with a data point category received by the fault detection module 120 can be associated with various topological information correlated to overall component health (e.g., health of a fan(s), a power supply(ies), a Quad Small Form-factor Pluggable (QFSP) connector status, etc.) of the compute device 110. In some embodiments, the signal 190 can be indicative of a value associated with a data point category that can be received directly from the compute device 110 or from one or more sensors connected to the compute device 110 and/or other components of the compute device 110.

In some embodiments, the fault detection module 120 can collect a set of data that can include a value associated with the data point category from the compute device 110 (i.e., the fault detection module 120 can collect, query, and/or pull, a value associated with the data point category from the compute device 110 rather than the compute device 110 pushing or sending the signal 190 indicative of a value associated with the data point category to the fault detection module 120). In some instances, the collection of a value associated with a data point category can be performed automatically and/or periodically. For example, the fault detection module 120 can collect a value associated with a data point category associated with a temperature of the compute device 110 once every minute without any interruption. For another example, the fault detection module 120 can collect a value associated with a data point category associated with a power consumption of the compute device 110 every hour. In other instances, data collection from the compute device 110 can be performed in an event-driven fashion. For example, the signal 190 indicative of a value associated with a data point category can be sent from the compute device 110 to the fault detection module 120 in response to the compute device 110 and/or the fault detection module 120 detecting a trend of an operative status of the compute device 110 changing from normal to fault. In other instances, data collection from the compute device 110 can be performed in an on-demand fashion. For example, after receiving a signal from a user input indicating a request for throughput data of the compute device 110, the fault detection module 120 can be configured to retrieve a value associated with a data point category (e.g., associated with network throughput) from the compute device 110. In still other instances, the compute device 110 can send the signal 190 indicative of a value associated with the data point category immediately in response to a change in operative status of the compute device 110 changing from normal to fault.

In some instances, the compute device 110 can send the signal 190 indicative of a value associated with a data point category at a first time to the fault detection module 120. In some instances, the data point category can be correlated to a fault category. For example, the data point category can be a temperature of a component (e.g., a processor) of the compute device 110 and the fault category can be, for example, "faulty air flow." In such instances, the value associated with the data point category substantially at the first time can be, for example, 100° F. In some instances, the value associated with the data point category at the first time can be below, for example, a fault value associated with the fault category (e.g., a maximum fault temperature such as, for example, 150° F.). Upon receiving the signal, substantially at the first time, the fault detection module 120 can send the signal 140 to the record module 130 indicative of an instruction to record a set of data associated with the compute device 110 in the unprotected mode. More specifically, with the value associated with the data point category below the threshold value at the first time, the record module 130 can record a set of data associated with the compute device 110 that can be systematically overwritten (as described above).

In some instances, the compute device 110 can send the signal 190 indicative of a value associated with the data point category at a second time, after the first time. In such instances, the value associated with the data point category substantially at the second time can be, for example, 115° F. In this manner, the value associated with the data point category at the second time can remain below, the fault value (e.g., the fault temperature of 150° F.). In such instances, however, a characteristic of a change in the value associated with the data point category at the first time to the value associated with the data point category at the second time can meet and/or cross a threshold value (e.g., by either exceeding a threshold value or by falling below a threshold value). The threshold value can correspond to one or more rules that are associated with the characteristic of the change in the value associated with the data point category at the first time to the value associated with the data point category at the second time. For example, the threshold value associated with the data point category and/or the fault category can be a rate of change in temperature (e.g., a 10° F. change in temperature per a unit of time) of the component of the compute device 110. In this manner, the characteristic of the change in the value associated with the data point category at the first time (e.g., 100° F.) to the value associated with the data point category at the second time (e.g., 115°) crosses the threshold value (e.g., 10° F.).

The change in the value associated with the data point category at the first time to the value associated with the data point category at the second time can be associated with a trend of the operative status of the compute device 110 advancing toward a fault status (yet not reaching the fault status). For example, the change in the value associated with the data point category at the first time to the value associated with the data point category at the second time can be associated with a trend of an increasing temperature of the component of the compute component 110 even though the value associated with the data point category has not reached a fault value (e.g., 150° F.). In this manner, the compute device 110 can send the signal 190 indicative of the value associated with the data point category at the second time and a signal indicative of the normal operative status of the compute device 110. With the characteristic of the change in the value associated with the data point category at the first time to the value associated with the data point category at the second time crossing the threshold, however, the fault detection module 120 can send the signal 140 to the record module 130 indicative of an instruction to record data associated with the compute device 110 in the protected mode to define a protected data set. Thus, the record module 130 can record and store the protected data set associated with the compute device 110 that is protected from being systematically overwritten.

In this manner, the protected data set stored by the record module 130 can be analyzed via an analysis module (not shown in FIG. 1), the fault detection module 120, and/or a user (e.g., an administrator or technician) to determine an event and/or condition associated with the trend toward the fault status (e.g., the fault temperature of 150° F.) of the component of the compute device 110 (and before reaching the fault status). More specifically, with the characteristic of the change in the value associated with the data point category at the first time to the value associated with the data point category at the second time crossing the threshold, prior to the compute device 110 reaching the fault state, the record module 130 can record a set of data including more information than would otherwise be included if the value of the data point category at the second time was correlated with the compute device 110 reaching the fault state. Similarly stated, the record module 130 can record a set of data including more information than a record module beginning to record protected data correlated with the compute device 110 changing from a normal operating status to a fault operating status.

As described above, in some instances, the threshold value associated with the data point category and/or the fault category can correspond to one or more rules. In some instances, the rules can be associated with a given time period that can be used to determine, for example, the rate of change and, therefore, the rules can be used define a given fault of the fault category. For example, in some instances, a rule (e.g., a first rule) associated with the threshold value can be a 10° F. change in temperature in a two week time period. In other instances, a rule (e.g., a second rule) associated with the threshold value can be a 10° F. change in temperature in a 30 minute time period. In some instances, the rules can be further associated with a diagnostic message or the like. For example, the first rule associated with a 10° F. change in air temperature in a two week time period can correspond to a first diagnostic message indicative of a recommendation to determine if an air inlet is blocked and the second rule associated with a 10° F. change in air temperature in a 30 minute time period can correspond to a second diagnostic message indicative of a recommendation to determine if a fan is functioning. In this manner, the characteristic of the change in the value associated with the data point category at the first time to the value associated with the data point category at the second time can be weighed against one or more rules associated with the fault category. In some instances, upon analyzing the protected data set (as described above), the fault detection module 120 can send a signal to the compute device 110 indicative of an instruction to deliver a diagnostic message to a user of the compute device 110 the is correlated to one or more of the rules (described above).

In some instances, the compute device 110 can send a value associated with the data point category to the fault detection module 120 at a third time, after the second time. In some instances, the value associated with the data point category at the third time can cross, for example, a second threshold value (e.g., can meet or cross a threshold value or criterion). In some instances, the change in the value associated with the data point category at the second time to the value associated with the data point category at the third time can be associated with the operative status of the compute device 110 changing from the normal operative status or state to the fault status or state. For example, in some instances, the value associated with the data point category at the third time can meet or cross the fault temperature of 150° F. (as described above). With the record module 130 in the protected mode (as described above), the record module 130 can record a protected data set correlated to the change in the operative status of the compute device 110. In some embodiments, the fault detection module 120 can send a signal to the compute device 110 indicative of an instruction to display an alarm indicator or message and/or to play a tone associated with an alarm. Thus, the fault status of the compute device 110 can be identified by the user, administrator, and/or technician.

In other instances, the value associated with the data point category at the third time can cross the threshold value in an opposite direction. Similarly stated, the value associated with the data point category at the third time can be associated with a trend of away from a fault status. For example, the value associated with the data point category at the third time can be associated with a decrease in temperature of the component of the compute device 110. In other instances, the value associated with the data point category at the third time can be associated with a decrease in CPU utilization, a decrease in page faults, a decrease in network utilization, etc. With the record module 130 in the protected mode (as described above), the fault detection module 120 can send the signal 140 to the record module 130, substantially at the third time, indicative of an instruction to record data associated with the compute device 110 in the unprotected mode. Thus, the protected data set recorded while the record module 130 was in the protected mode can include information associated with events and/or conditions that can cause the operative status of the compute device 110 to trend toward a fault status as well as information associated with events and/or conditions that can cause the operative status of the compute device 110 to trend away from the fault status (e.g., toward a normal status).

Figure 2:
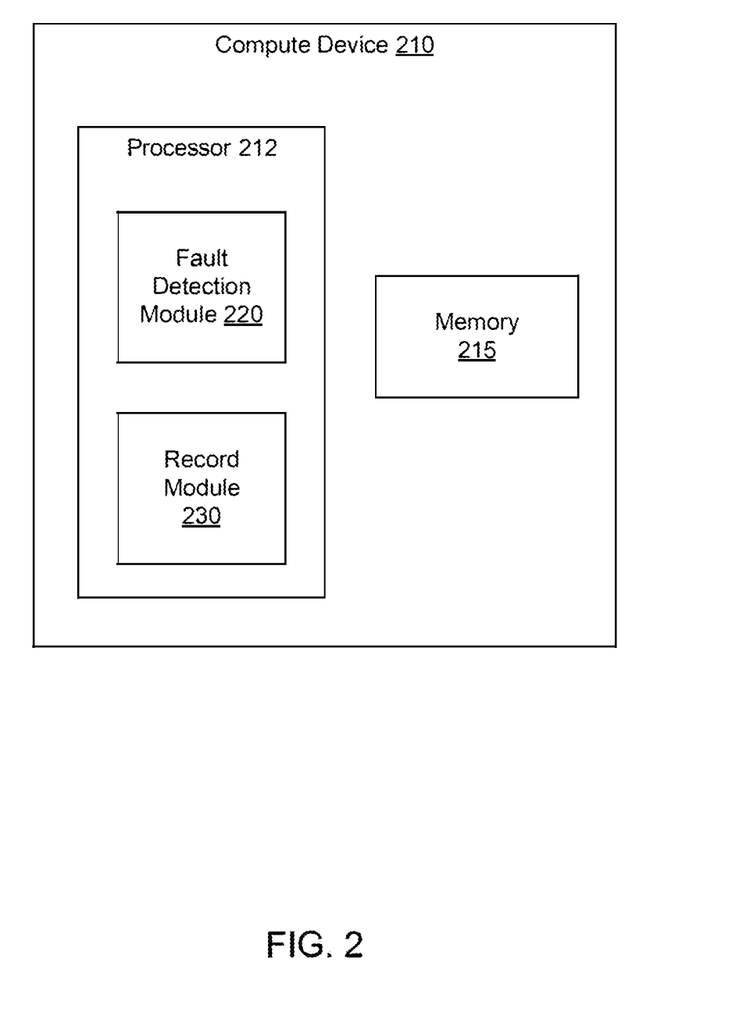
FIG. 2 is a schematic illustration of a compute device configured to record data associated with a fault condition, according to an embodiment.

Although the fault detection module 120, the record module 130, the compute device 110 are shown in FIG. 1 as being operatively coupled and in communication via the network 170, in other embodiments, a compute device can include a fault detection module and a record module as, for example, a hardware and/or software module. For example, FIG. 2 is a schematic illustration of a compute device 210 according to such an embodiment. The compute device 210 includes at least a processor 212 and a memory 215. As described above, the compute device 210 can be any suitable electronic device, equipment, and/or component. For example, in some embodiments, the compute device 210 can be a user device (e.g., a personal computer (PC), a laptop, Personal Digital Assistant (PDA), a tablet, a smart-phone, and/or the like), and/or a host device (e.g., a server, a top-of-rack device (TOR), a network storage device, a server blade, a switch fabric node, and/or the like).

The memory 215 of the compute device 210 can be, for example, a random access memory (RAM) (e.g., a dynamic RAM, a static RAM), a flash memory, a removable memory, a memory buffer, a hard drive, and/or so forth. The memory 215 can store and/or include instructions to cause the processor 212 of the compute device 210 to perform a set of processes that can be associated with, for example, an application, a virtual machine, a switching process, a routing process, and/or the like. The processor 212 of the compute device 210 can be any processing device or component configured to execute a set of instructions that are stored, for example, in the memory 215 of the compute device 210. For example, the processor 212 can be or can include a central processing unit (CPU), a general processing unit, a network processor, a front end processor, an Application-Specific Integrated Circuit (ASIC), a Digital Signal Processor (DSP), a Field Programmable Gate Array (FPGA) and/or the like. As shown in FIG. 2, the processor 212 can include a fault detection module 220 and a record module 230. Although fault detection module 220 and the record module 230 are shown in FIG. 2 as being included in the processor 212, in other embodiments, a separate compute device can include a fault detection module and a record module that are operatively coupled to a processor (e.g., not included in the processor).

The fault detection module 220 can be, for example, a hardware module and/or a software module executed at a processor 212. For example, a fault detection module can be a software module stored in a memory of a compute device (e.g., the compute device 210) and executed in hardware (e.g., the processor 212) of that compute device. As described in further detail herein, the fault detection module 220 can receive a signal indicative of an event and/or condition associated with a fault state of the compute device 210 and can send a signal to the record module 230 indicative of an instruction to record data associated with the compute device 210.

The record module 230 can be, for example, a hardware module and/or a software module stored in a memory 215 and executed at the processor 212. The record module 230 can be, for example, a log system or the like configured to record and at least temporarily store a log of data associated with the compute device 210 (as described above). More specifically, the record module 230 can have a protected mode of recording and an unprotected mode of recording. While in the unprotected mode of recording, the record module 230 can temporarily store a set of data (e.g., a log) collected at a first time and/or during a first time period and can systematically overwrite the set of data (e.g., at least a portion of the stored logs) with a set of data recorded at a second time and/or during a second time period, after the first time and/or after the first time period, respectively. While in the protected mode of recording, the record module 230 can receive and store a set of data (e.g., a log) that is protected from being overwritten. In other words, a set of data collected and/or received while the record module 230 is in the protected mode can define a protected data set. As described in further detail herein, the record module 230 can receive the signal from the fault detection module 220 that is indicative of an instruction to record data associated with an operative status of the compute device 210 in the protected mode.

The fault detection module 220 and the record module 230 can function similarly to the fault detection module 120 and the record module 130 described above with reference to FIG. 1 and, therefore, an in-depth description of the function of the fault detection module 220 and the record module 230 is not described in detail herein. In this manner, the fault detection module 220 can receive and/or detect a value associated with a data point category indicative of an operative status of the compute device 210 at a first time. As described above, the data point category is correlated to a fault category. In some instances, upon receiving and/or detecting the value associated with the data point category, the fault detection module 220 can send a signal to the record module 230 indicative of an instruction to record data in the unprotected mode. In some instances, the fault detection module 220 can receive and/or detect a value associated with the data point category at a second time, after the first time. Therefore, as described in detail above with reference to FIG. 1, when a characteristic of a change in the value associated with the data point category at the first time to value associated with the data point category at the second time crosses a given threshold (e.g., a temperature threshold, a CPU utilization threshold, a network utilization threshold, a power usage threshold, etc.), the fault detection module 220 can send a signal to the record module 230 indicative of an instruction to record data associated with the compute device 210 in the protected mode to define a protected data set. Thus, the protected data set can be protected from being overwritten and/or deleted. In this manner, the fault detection module 220, the processor 212, and/or a user can analyze the protected data set to determine, for example, an event and/or a condition that correlates to the changing of the value associated with the data point category at the first time to the value associated with the data point category at the second time.

Figure 3:
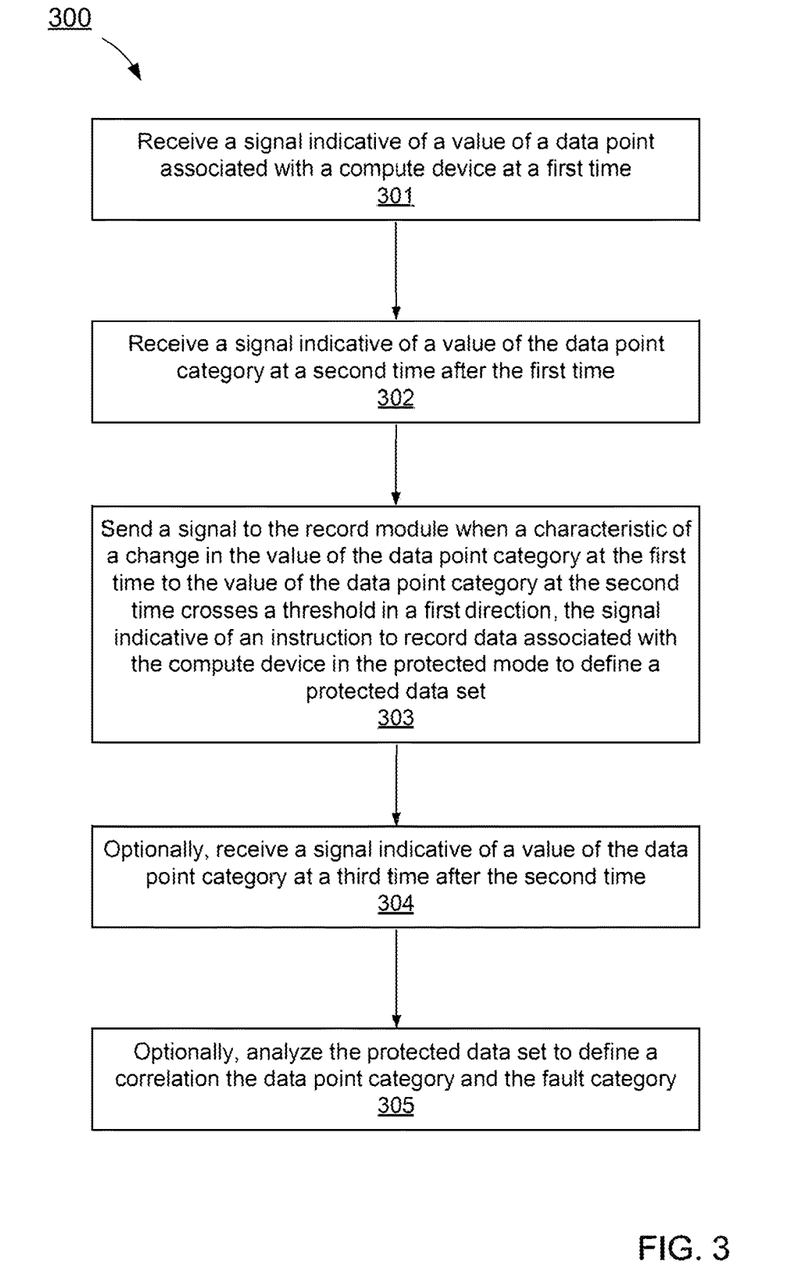
FIG. 3 is a flowchart illustrating a method for recording data associated with a fault condition, according to an embodiment.

FIG. 3 is a flowchart illustrating a method 300 for recording data associated with a fault condition, according to an embodiment. The method 300 includes receiving a signal indicative of a value associated with a data point category associated with a compute device at a first time, at 301. The compute device can be any of those described herein. For example, in some embodiments, the compute device can be substantially similar to the compute device 110 described above with reference to FIG. 1. The compute device can be operatively coupled to a fault detection module and a record module. For example, in some embodiments, the compute device can be in communication with the fault detection module and the record module via a network (as shown in FIG. 1). In other embodiments, a compute device can include the fault detection module and the record module (as shown in FIG. 2). For example, the fault detection module and the record module can be hardware modules and/or software modules that can be included in and/or executed at a processor. As described above, the record module can receive a signal indicative of an instruction to record a set of data in an unprotected mode and a protected mode.

The data point category is correlated with a fault category. Such a data point category (i.e., a fault category) can include, for example, a number of page faults, a repair rate, a network throughput, an error rate, a CPU utilization, a temperature, an operative status, a power consumption, a mean time-between-failure, etc., of the compute device. In some embodiments, a value associated with the data point category received by the fault detection module 120 can be associated with information correlated to an overall component health of the compute device 110 (as described above).

At a second time, after the first time, a signal can be received (e.g., at the fault detection module or the like) indicative of a value associated with the data point category at the second time, at 302. When a characteristic of a change in the value associated with the data point category at the first time to the value associated with the data point category at the second time crosses a threshold in a first direction, a signal can be sent to the record module indicative of an instruction to record data associated with the compute device in the protected mode to define a protected data set, at 303. For example, in some embodiments, the change in the value associated with the data point category at the first time to the value associated with the data point category at the second time can be associated with a trend toward the fault category. Similarly stated, the change in the value associated with the data point category can be indicative of an operative status of the compute device trending toward the fault category (e.g., an air flow fault, a CPU utilization fault, etc.). In some embodiments, a signal can be sent that can be indicative of an instruction to deliver a diagnostic message to a user of the compute device. For example, the characteristic of the change in the value associated with the data point category at the first time to the value associated with the data point category at the second time can be associated with an decrease in CPU utilization, an increase in memory usage, and/or in increase in page rate that is indicative of a trend toward a thrashing state. In such instances, the compute device can receive a signal indicative of an instruction to deliver a diagnostic message to the user of the compute device such as, for example, "Close Any Unused Applications." Furthermore, in some instances, the compute device can receive a signal indicative of an instruction to detect a process that is using an increasing amount of memory (e.g., "leaking memory"). In such instances, a module of the compute device (e.g., a memory usage module or the like) can isolate and/or monitor the process and the compute device can deliver a diagnostic message such as, of example, "An Application Is Leaking Memory." In other instances, the fault category can be associated with a temperature and the compute device can receive a signal indicative of an instruction to deliver a diagnostic message to a user such as, for example, "Check Fan and Air Inlet," or the like In some instances, the method 300 optionally includes receiving a signal indicative of a value associated with the data point category at a third time, after the second time, at 304. In some instances, the value associated with the data point category at the third time can cross, for example, a second threshold value. The change in the value associated with the data point category at the second time to the value associated with the data point category at the third time can be associated with the operative status of the compute device changing from the normal operative status or state to the fault status or state. In some embodiments, a signal can be sent that can be indicative of an instruction to deliver a second diagnostic message to a user of the compute device. For example, upon receiving the signal, the compute device can display an alarm and/or to play a tone associated with an alarm. Thus, the fault status of the compute device can be identified by the user, administrator, and/or technician.

In other instances, the value associated with the data point category at the third time can cross the threshold value in a second direction that is opposite the first direction. Similarly stated, the value associated with the data point category at the third dime can be associated with a trend away from a fault status. For example, the value associated with the data point category at the third time can be associated with a decrease in CPU utilization, a decrease in temperature, a decrease in page faults, etc. In some instances, a signal can be sent to the record module, substantially at the third time, indicative of an instruction to record data associated with the compute device in the unprotected mode. Thus, the protected data set recorded while the record module was in the protected mode can include information associated with events and/or conditions that can cause the operative status of the compute device to trend toward a fault status as well as information associated with events and/or conditions that can cause the operative status of the compute device to trend away from the fault status (e.g., toward a normal status). The method 300 can optionally include analyzing the protected data set to define a correlation between the change in the value associated with the data point category at the first time to the value associated with the data point category at the second time and the fault category, at 305.

Figure 4:
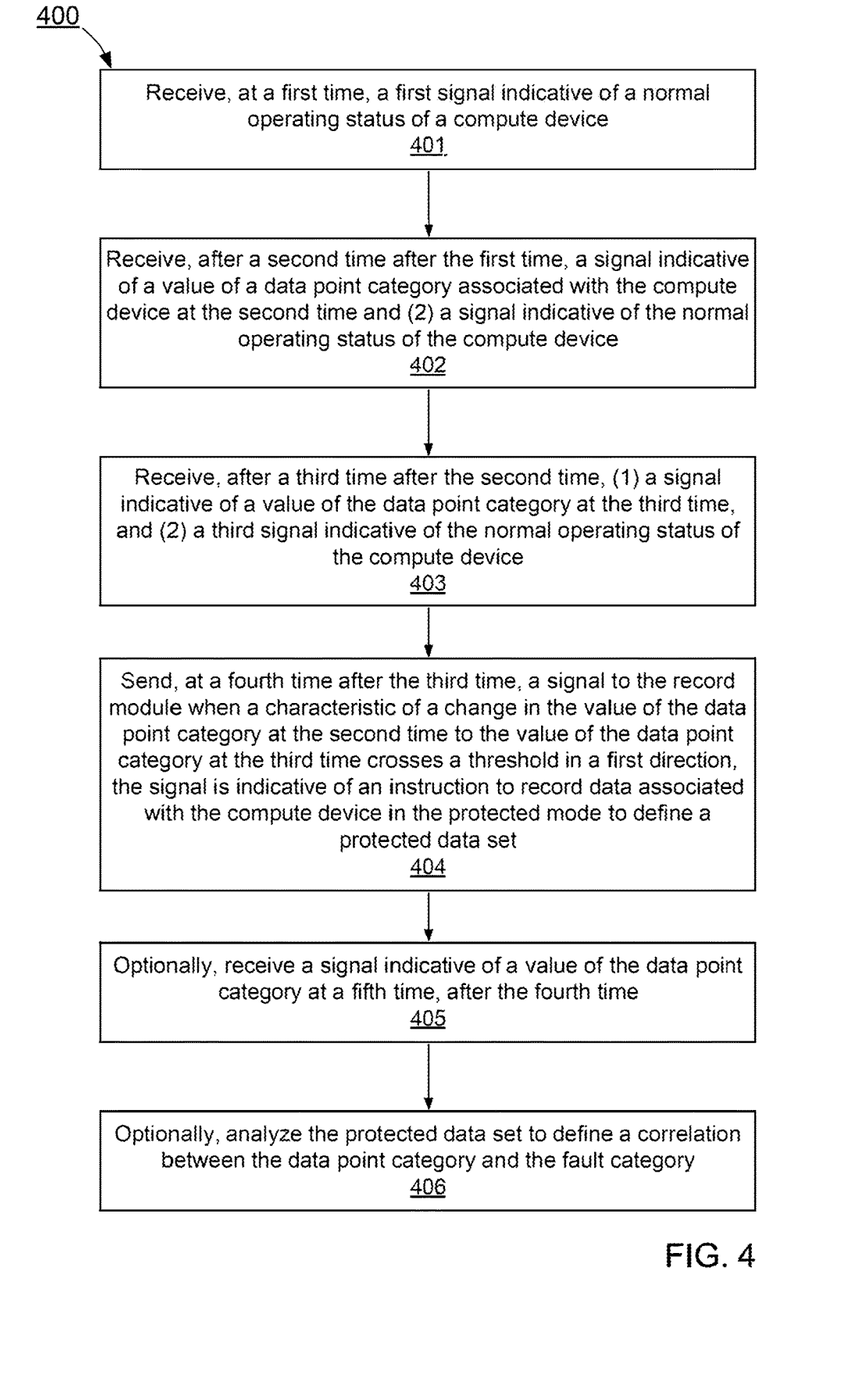
FIG. 4 is a flowchart illustrating a method for recording data associated with a fault condition, according to another embodiment.

FIG. 4 is a flowchart illustrating a method 400 for recording data associated with a fault condition, according to an embodiment. The method 400 includes receiving a signal, at a first time, indicative of a normal operating status of a compute device, at 401. The compute device can be any of those described herein. For example, in some embodiments, the compute device can be substantially similar to the compute device 110 described above with reference to FIG. 1. The compute device can be operatively coupled to at least a record module. For example, in some embodiments, the compute device can be in communication with the record module via a network (as shown in FIG. 1). In other embodiments, a compute device can include the record module. For example, the record module can be a hardware module and/or a software module that can be included in and/or executed at a processor. As described above, the record module can receive a signal indicative of an instruction to record a set of data in an unprotected mode and a protected mode.

After a second time that is after the first time, a signal can be received that is indicative of a value associated with a data point category associated with the compute device at the second time and a second signal that is indicative of the normal operating status of the compute device, at 402. The value associated with the data point category at the second time can be, for example, correlated to a faulty operating status of the compute device. Such a faulty operating status can include, for example, a number of page faults, a repair rate, a network throughput, an error rate, CPU utilization, a temperature, an operative status, power consumption, a mean time-between-failure, etc., of the compute device. In some embodiments, a value associated with the data point category can be associated with topological information correlated to an overall component health of the compute device (as described above). In this manner, the signal indicative of the value associated with the data point category at the second time, which is correlated with a faulty operating status of the compute device, can be sent while the operative status of the compute device is still normal.

After a third time that is after the second time, a signal can be received that is indicative of a value associated with the data point category at the third time and a third signal that is indicative of the normal operating status of the compute device, at 403. Similarly stated, the signal indicative of the value associated with the data point category at the third time, which is correlated with the faulty operating status of the compute device, can be sent while the operative status of the compute device is still normal. When a characteristic of a change in the value associated with the data point category at the second time to the value of the data point at the third time crosses a threshold in a first direction, a signal can be sent to the record module, at a fourth time after the third time, indicative of an instruction to record data associated with the compute device in the protected mode to define a protected data set, at 404. For example, in some embodiments, the change in the value associated with the data point category at the second time to the value associated with the data point category at the third time can be associated with a trend toward the fault category. Similarly stated, the change in the value associated with the data point category can be indicative of an operative status of the compute device trending toward the faulty operating status. In some embodiments, a signal can be sent that can be indicative of an instruction to deliver a diagnostic message to a compute device user (as described above).

In some instances, the method 400 optionally includes receiving a signal indicative of a value associated with the data point category at a fifth time, after the fourth time, at 405. In some instances, the value associated with the data point category at the fifth time can cross, for example, a second threshold value. The change in the value associated with the data point category at the fourth time to the value associated with the data point category at the fifth time can be associated with the operative status of the compute device changing from the normal operative status or state to the fault status or state. In some embodiments, a signal can be sent that can be indicative of an instruction to deliver a second diagnostic message to a compute device user. For example, upon receiving the signal, the compute device can display an alarm and/or to play a tone associated with an alarm. Thus, the fault status of the compute device can be identified by the user, administrator, and/or technician.

In other instances, the value associated with the data point category at the fifth time can cross the threshold value in a second direction that is opposite the first direction. Similarly stated, the value associated with the data point category at the fifth time can be associated with a trend away from a fault status. For example, the value associated with the data point category at the third time can be associated with a decrease in CPU utilization, a decrease in temperature, a decrease in page faults, etc. In some instances, a signal can be sent to the record module, substantially at the fifth time, indicative of an instruction to record data associated with the compute device in the unprotected mode. Thus, the protected data set recorded while the record module was in the protected mode can include information associated with events and/or conditions that can cause the operative status of the compute device to trend toward a fault status as well as information associated with events and/or conditions that can cause the operative status of the compute device to trend away from the fault status (e.g., toward a normal status). The method 400 can optionally include analyzing the protected data set to define a correlation between the characteristic of the change in the value associated with the data point category to the value of the data point at the second time and the fault category, at 406.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

What is claimed is:

1. An apparatus comprising:
   a memory; and
   a processor operatively coupled to the memory, the processor configured to:
     receive, from a compute device, a signal indicative of a first performance value associated with a data point category of the compute device at a first time, the data point category being correlated with a fault category of the compute device,
     receive, from the compute device, a signal indicative of a second performance value associated with the data point category of the compute device at a second time after the first time,
     store in the memory a protected data set, when 1 the first performance value and the second performance value are not greater than a fault state value associated with the compute device, 2) the second performance value is closer to the fault state value than the first performance value and, 3) a difference between the first performance value and the second performance value is greater than a predetermined threshold value such that, the protected data set is protected from being overwritten by the processor and includes data associated with an operative status of the compute device indicative of a trend of the compute device towards the fault category,
     receive, from the compute device a signal indicative of a third performance value associated with the data point category of the compute device at a third time after the second time, and
     store in the memory an unprotected data set, when 1) the third performance value is not greater than the fault state value and farther from the fault state value than the second performance value, and 2) a difference between the second performance value and the third performance value is greater than the predetermined threshold value such that, the unprotected data set is not protected from being overwritten by the processor at a fourth time after the third time.

2. The apparatus of claim 1, wherein the processor is further configured to:
   send a signal to the compute device indicative of an instruction to deliver a diagnostic message to a user of the compute device when the protected data set is stored in the memory.

3. The apparatus of claim 1, wherein the predetermined threshold value is a first predetermined threshold value, the processor further configured to:
   receive a signal indicative of a fourth performance value associated with the data point category of the compute device at a fifth time after the second time and before the third time,
   determine whether a difference between the second performance value and the fourth performance value crosses a second predetermined threshold value, and
   send a signal to the compute device indicative of an instruction to deliver a second diagnostic message to a user to the compute device.

4. The apparatus of claim 1, wherein the data point category of the compute device is a page faults and the fault category of the compute device is a slow system fault.

5. The apparatus of claim 1, wherein the predetermined threshold value is a first predetermined threshold value, the processor further configured to:
   send to the compute device, a signal indicative of an alarm when a fourth performance value associated with the data point category of the compute device and received from the compute device at a fifth time after the second time and before the third time, crosses a second redetermined threshold value, the fourth performance value 1) is not greater than the fault state value associated with the compute device, 2) the fourth performance value is closer to the fault state value than the third performance value.

6. The apparatus of claim 1, wherein the data point category of the compute device is a first data point category, and the processor further configured to:
   analyze the protected data set to define a correlation between a second data point category of the compute device and the fault category of the compute device.

7. A non-transitory processor-readable medium storing code representing instructions to be executed by a processor, the code comprising instructions that when executed by the processor cause the processor to:
   store in a memory configured to operate in an unprotected mode an unprotected data set with operative status data captured from a compute device, the unprotected data set not protected from being overwritten by the processor,
   receive a first performance value of a data point category of the compute device captured from the compute device at a first time, the data point category associated with a first diagnostic rule,
   receive a second performance value of the data point category of the compute device captured from the compute device at a second time,
   send a command signal to the memory based on the first diagnostic rule and a change between the first performance value and the second performance value, such that, the memory operates in a protected mode,
   store in the memory configured to operate in the protected mode, a protected dataset with operative status data captured from the compute device, the protected data set is protected from being overwritten by the processor, and
   analyze, at least one of an event or a condition included in the operative status data of the protected data set, based on a second diagnostic rule associated with a fault status of the compute device, a rate of the change between the first performance value and the second performance value, and the at least one of the event or the condition.

8. The non-transitory processor-readable medium of claim 7, wherein the data point category is a first data point category, the command signal is a first command signal, and the protected data set is a first protected dataset, and the non-transitory processor-readable medium further storing code representing instructions that when executed by the processor cause the processor to:
   receive a signal indicative of a change between a first performance value of a second data point category of the compute device, at a third time and a second performance value of the second data point category of the compute device, at a fourth time, the second data point category of the compute device associated with the second diagnostic rule, and send a second command signal to the memory indicative of an instruction to store a second protected data set with operative status data of the compute device and at least one characteristic of the change between the first performance value of the second data point category of the compute device and the second performance value of the second data point category of the compute device.

9. The non-transitory processor-readable medium of claim 7, wherein the first diagnostic rule is associated with page faults.

10. The non-transitory processor-readable medium of claim 7, wherein the protected data set is a first protected data set and the command signal is a first command signal, the non-transitory processor-readable medium further storing code representing instructions that when executed by the processor cause the processor to:

receive prior to the first time, a signal from the compute device with an indication of a fault associated with the first diagnostic rule, and send, in response to the indication, a second command signal to the memory to store a second protected data set with operative status data-captured from the compute device.

11. The non-transitory processor-readable medium of claim 7, further storing code representing instructions that when executed by the processor cause the processor to:

send to a network access device, a signal configured to modify an operation of the compute device, based on at least one characteristic of the change between the first performance value and the second performance value.

12. The non-transitory processor-readable medium of claim 7, wherein the data point category of the compute device is one of temperature, memory utilization, or processor usage.

13. A method comprising:

receiving at a processor coupled to a memory, a signal that indicates operative status data of a compute device at a first time, the memory designated to operate in an unprotected mode at the first time, storing in the memory an unprotected data set that includes the operative status data of the compute device at the first time, the unprotected data set not protected from being overwritten by the processor, receiving, from the compute device, at a second time after the first time, a signal indicative of a first performance value associated with a data point category of the compute device correlated with a fault operating state of the compute device, receiving, from the compute device, at a third time after the second time, a signal indicative of a second performance value associated with the data point category of the compute device, determining whether a characteristic of a change between the first performance value and the second performance value crosses a predetermined threshold value in a direction indicative of a trend of the compute device towards the fault operating state, sending, at a fourth time after the third time, upon a determination that the characteristic of the change between the first performance value and the second performance value crosses the predetermined threshold value in the direction indicative of the trend of the compute device towards the fault operating state, a command signal to the memory to designate the memory to operate in a protected mode, and storing a protected data set with the operative status data e of the compute device, the protected data set protected from being overwritten by the processor, and includes operative status data indicative of a transition of the compute device from a normal operating status towards the fault operating state.

14. The method of claim 13, wherein the predetermined threshold value is a first predetermined threshold value, the method further comprising:

sending a signal to the compute device indicative of an alarm upon the determination that the characteristic of the change between the first performance value and the second performance value crosses the first predetermined threshold value in the direction indicative of the trend of the compute device towards the fault state, and upon a determination that a performance value associated with the data point category of the compute device received at a fifth time after the fourth time crosses a second predetermined threshold value in the first direction indicative of the trend of the compute device towards the fault operating state, the second predetermined threshold value closer to a fault state value than the first predetermined threshold value.

15. The method of claim 13, wherein the signal that indicates operative status data of the compute device is a first operative status data signal, the method further comprising:

receiving a second operative status data signal that indicates operative status data of the compute device at a fifth time after the fourth time, and including the operative status data of the compute device at the fifth time in the protected data set.

16. The method of claim 13, further comprising:

sending a signal to the compute device configured to modify an operating status of the compute device, upon the determination that the characteristic of the change between the first performance value and the second performance value crosses the predetermined threshold value in the direction indicative of the trend of the compute device towards the fault operating state.

17. The method of claim 13, further comprising:

sending a signal to the compute device configured to cause the compute device to deliver a diagnostic message at the compute device, upon the determination that the characteristic of the change between the first performance value and the second performance value crosses the predetermined threshold value in the direction indicative of the trend of the compute device towards the fault operating state.

18. The method of claim 13, wherein the data point category of the compute device is a first data point category, the method further comprising:

analyzing the protected data set to define a correlation between a second data point category of the compute device and the fault operating status.

19. The method of claim 13, wherein the data point category of the compute device includes temperature and the fault operating status includes a blocked inlet fault.

20. The method of claim 13, wherein the data point category of the compute device is one of a number of page faults, repair rate, a network throughput, an error rate, a computer processing unit utilization, a power consumption, or a mean time-time-between-failure.

* * * * *